F. D. WEST.
WEIGHING SCALE.
APPLICATION FILED APR. 1, 1909.
931,909.
Patented Aug. 24, 1909.
3 SHEETS—SHEET 1.
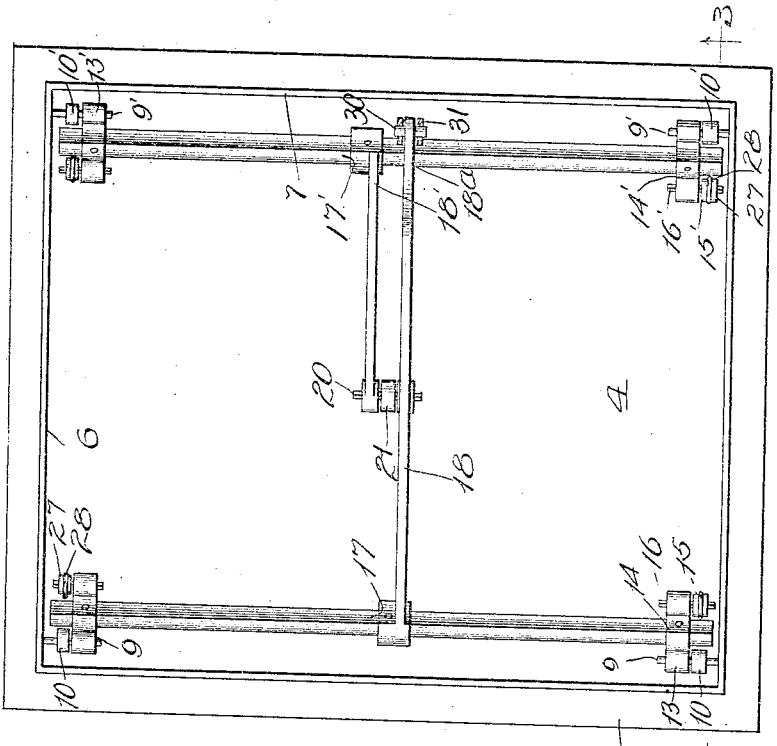
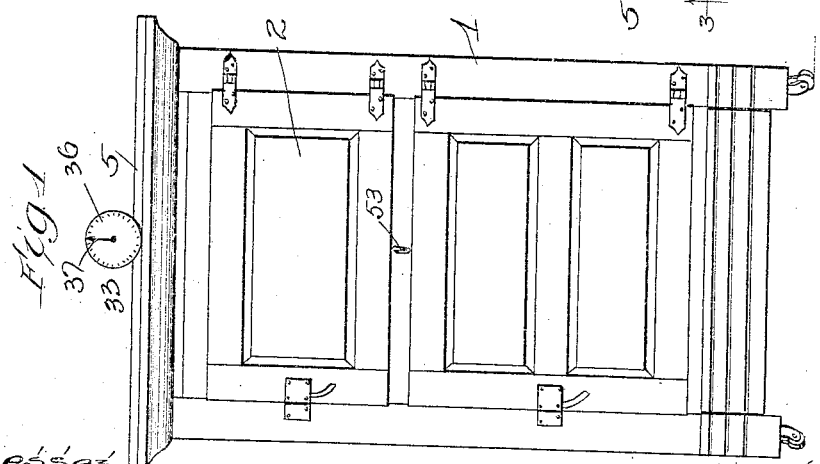
Witnesses
Harry R. Lurlite
R. A. White
Inventor
Fred D. West
By Foree Bain and May
Attys F. D. WEST.
WEIGHING SCALE.
APPLICATION FILED APR. 1, 1908.
931,909.
Patented Aug. 24, 1909.
3 SHEETS—SHEET 2.
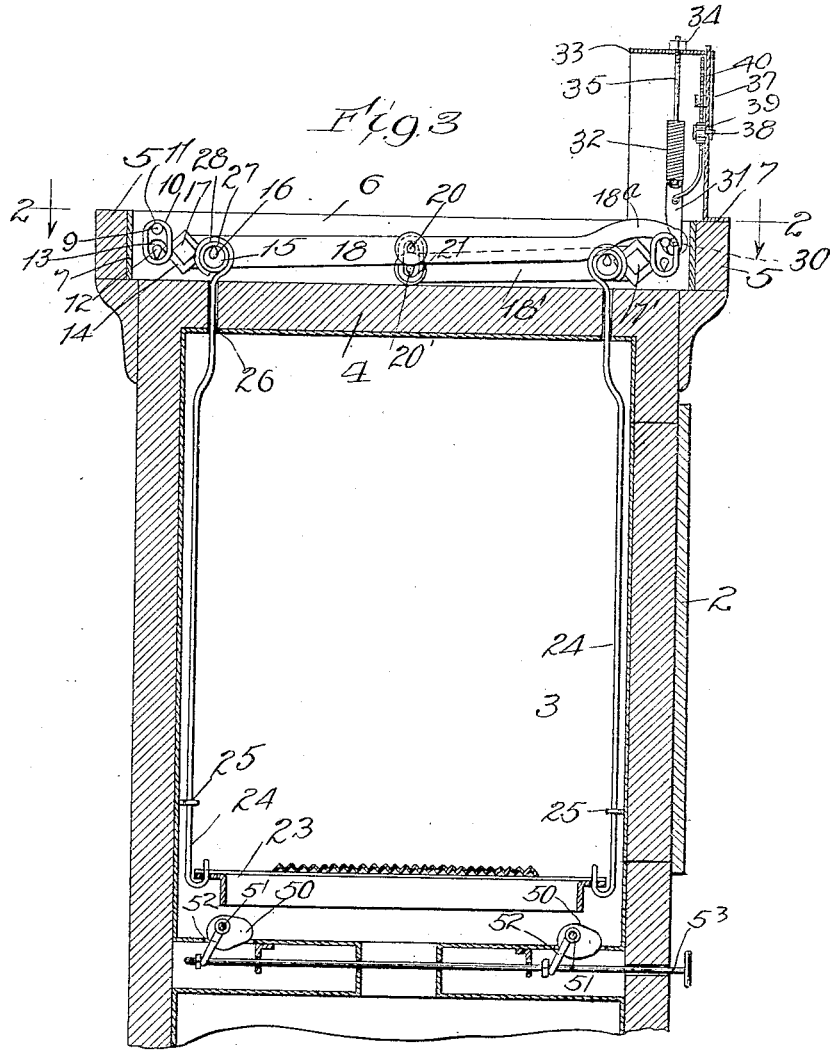
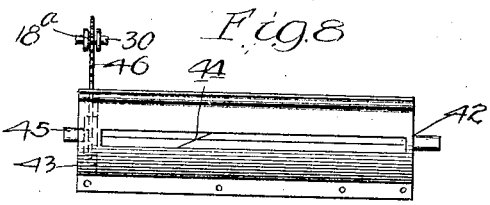
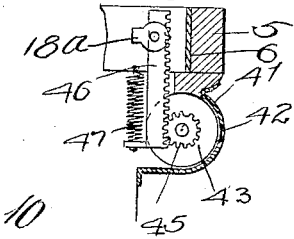
Witnesses
Harry R. L. White
R. A. White
Inventor,
Fred D. West
By Foree Bain and May Attys

F. D. WEST.
WEIGHING SCALE.
APPLICATION FILED APR. 1, 1909.

931,909.

Patented Aug. 24, 1909.
3 SHEETS—SHEET 3.

Witnesses
Harry R. L. White
R. A. White.

Inventor
Fred D. West
By Foree Bain and May Attys

UNITED STATES PATENT OFFICE.

FRED D. WEST, OF CHICAGO, ILLINOIS.

WEIGHING-SCALE.

931,909.  Specification of Letters Patent.  Patented Aug. 24, 1909.

Application filed April 1, 1908. Serial No. 424,560.

*To all whom it may concern:*

Be it known that I, FRED D. WEST, a citizen of the United States, residing at Chicago, in the county of Cook and State of Illinois, have invented certain new and useful Improvements in Weighing-Scales, of which the following is a specification.

My invention relates to improvements in weighing scales, and more particularly to weighing scales for association with refrigerators, arranged to support the ice upon the scale platform, and to indicate at a suitable point, visible from the exterior of the refrigerator, the weight of the ice therein, so that the weighings of the ice dealers may be readily checked up and the quantity of ice within the refrigerator accurately ascertained at any time without opening of the ice compartment.

One of the objects of my invention is to provide a refrigerator scale arrangement wherein the scale elements will not be subject to the effects of moisture and cold within the ice chamber; to provide an advantageous scale construction particularly adapted for refrigerators, and to provide a generally improved scale movement.

Figure 4:
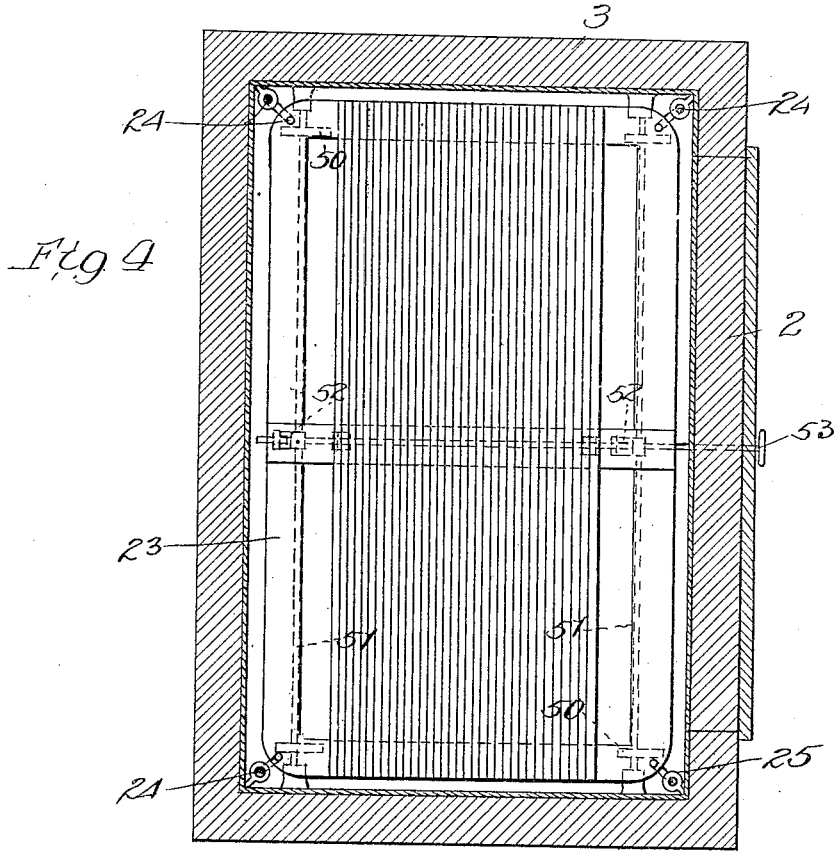
Figure 5:
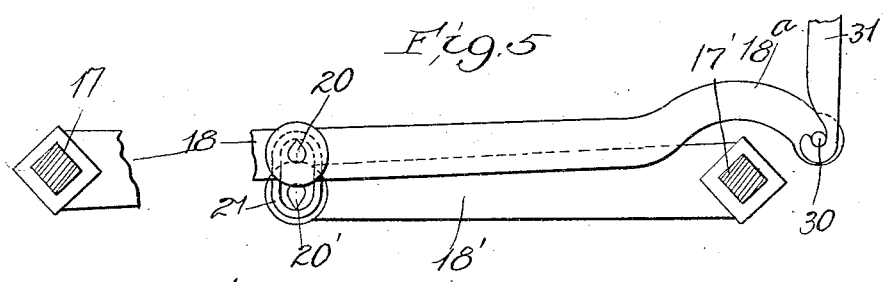
Figure 6:
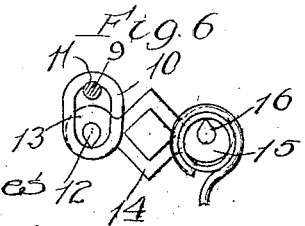
Figure 7:
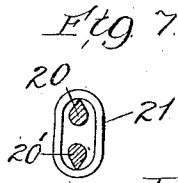

In the drawing; Figure 1 is a front elevation of a refrigerator, showing the indicating mechanism of the scale as applied thereto in one embodiment of my invention. Fig. 2 is a horizontal section on line 2—2 of Fig. 3. Fig. 3 is a vertical section on line 3—3 of Fig. 2. Fig. 4 is a horizontal section through the ice chamber. Fig. 5 is an enlarged detail of a portion of the scale lever mechanism. Fig. 6 is an enlarged detail of a scale beam, supports and connection. Fig. 7 is an enlarged detail of the connection between two scale beams. Fig. 8 is a front elevation of a modified form of scale indicator. Fig. 9 is a side elevation thereof. Fig. 10 is a detail of the indicating cylinder.

In the drawings 1 indicates in general a refrigerator casing provided with a door 2 opening into the ice compartment 3 which is preferably generally rectangular in shape and provided with a top 4 crowned by a boundary wall 5 surrounding a horizontal space or chamber 6 in which is placed the scale beam mechanism, to be described. In the chamber 6 thus provided is arranged a rectangular frame 7 and upon the side members of said frame 7 near the rear extremity thereof, are provided two supporting pins, 9—9, constituting a pair, arranged in axial alinement in confronting relation, and near the front extremities of said side member are arranged a like pair of supporting pins 9′, 9′, in similar relation, all of said pins being in the same horizontal plane, and each such pin being preferably round.

From each of the pins or supports 9, and 9′ is suspended a link or loop 10, of generally elliptical shape, having its upper rounded end grooved, as at 11, to form a saddle to accurately position it upon the support 9. Bearing upon the lower closed end of each loop is a downwardly presented knife edge, or fulcrum 12, projecting from the arm 13 of a hanger 14, which has also an oppositely projecting arm 15, carrying an upwardly presented knife edge or fulcrum 16. The two rear flanges are connected together by a transverse bar fixed against rotation in such hangers; to this end the bar 17, being preferably a square rod turned to diagonal position, and engaging correspondingly shaped sockets in the bracket 14. The front hangers are correspondingly connected by bar 17′. Approximately mid-way of its length the bar 17 has fixed thereto a lever arm or beam 18, projecting forward at an angle slightly above the horizontal, nearly to the front wall of the frame 7, the extremity 18$^a$ of said arm being appropriately bowed where it passes over the bar 17′. Said front bar 17′ is provided with a rearwardly extending lever arm 18′ extending downward slightly below the horizontal, to a point midway between the bars 17, 17′. At such median point the two arms 18 and 18′ are linked together, to this end being provided with vertically alining, oppositely disposed knife edges, or fulcrums 20, 20′, respectively, bearing upon the inner surfaces of a free link 21, as best shown in Figs. 5 and 7, the link 21, being arranged at a point equidistant from all four fulcrums 16, that is to say, at the center of the scale lever movement.

The load platform is supported from the four hangers 14. To this end I arrange within the rectangular ice chest 3 a horizontal ice rack 23 of suitable construction, constituting a scale platform, such ice rack being carried at its four corners by rods 24, engaging guides 25 within the ice chamber, and passing through openings 26 in the top 4, of the ice chamber in vertical alinement with the four fulcrum points 16 such openings 26 being preferably small, so that there is no substantial aperture through the top when the rods 24 are in place. Each supporting rod 24 is at its upper end coiled into a clamp 27 tightly engaging a thimble 28, the interior surface of which bears upon the knife edge 16, so constituting a removable and renewable wearing surface.

It will be observed that the platform or ice rack 23 is supported for vertical movement and guidedly maintained against lateral movement, so that the weight of any mass of ice placed thereon falls equally upon the four points 16.

The downward pull of the load is resisted by a suitable spring connected to the lever system, with which is also operatively associated an indicating mechanism which may, in the broader aspect of my invention, be of any desired construction.

Specifically in the construction shown in Figs. 1 and 3 the extremity 18$^a$ of lever arm 18 is provided with a pin 30 engaging a link 31 directly connected with a tension spring 32 contained within a casing 33, mounted upon the top of the wall 5 and adjustable by means of a nut 34 engaging the stem 35, to which the upper end of the spring 32 is attached. On the front face of the casing 33 is provided a dial 36 and a hand 37 is arranged upon a staff 38 for movement over the dial, said staff 38, within the casing, being provided with a pinion 39 meshing with the rack 40, connected to and movable with the link 31. For some of the purposes of my invention, however, I prefer that the indicating mechanism should be embodied, as shown in Figs. 8 and 10, that is to say, arranged below the upper edge or wall 5, and to this end I preferably arrange between the face of the refrigerator and the overhanging ornamental top thereof a suitable rounded, elongated casing 41, having a reading aperture 42 extending longitudinally of its face, closed by a glass, bearing a longitudinal sight line, and within such casing I arrange for rotation a weight indicating cylinder 43, longitudinally elongated, and having marked thereon in a continuous spiral form the weight indication marks 44, as shown in Fig. 10, such marks by reason of their spiral arrangement being clearly separated and widely spaced apart, so that very minute gradations may be accurately represented, with ample space for legible indications of the weights. The means for moving the cylinder 44 are in principle the same as those heretofore described for moving the hand over the dial, such means consisting of a pinion 45, associated for rotation with the cylinder 43, said pinion being engaged by a rack-bar 46, held normally in raised position by a tension spring 47, and directly connected with the extremity 18$^a$ of the beam or lever 18.

As a further refinement, I preferably provide means for temporarily positively supporting the ice platform against depression, so that when ice is thrown thereon the strains may not fall upon the scale movement or connecting links, but is taken upon the positive supports. In the construction shown 50—50 indicate cams whereof four are provided below the corners of the platform, such cams being arranged in front and rear pairs upon parallel shafts 51, provided centrally with lever arms 52 engaging an actuating slide rod 53 extending to the exterior of the refrigerator. When the rod 53 is pushed in the cams are rotated to free the platform, but when said rod is drawn out, the cams elevate the platform to take its weight off of the links and levers normally supporting it.

It will be observed that the scale construction heretofore described comprises an arrangement with the hangers and levers substantially all in a horizontal plane and occupies only such a limited, vertical compass as to add but little to the height of an ice box or refrigerator, while disposing the lever mechanism in position free from the damaging effect of the moisture and cold which exists within the ice box; and further, that it affords a simple, efficient and accurate weight indicating means.

While I have herein described the scale movement merely as applied to refrigerators, it will be apparent to those skilled in the art that the scale might be used in other environments, and that numerous changes in the specific construction might be made without departure from the spirit and scope of my invention.

Having described my invention, what I claim is;

1. The combination with a refrigerator, of an ice platform within the refrigerator, a scale lever mechanism confined within an area of small vertical dimensions outside of and above the refrigerator, and operative connections between the lever mechanism and the platform.

2. The combination with a refrigerator having an ice chamber therein, of an ice platform within the chamber, a scale lever mechanism located above the platform and occupying a horizontal space of small vertical dimensions, and providing suspension points adjacent to vertical alinement with the corners of the platform, and suspension links connecting the corners of the platform with the suspension points of the scale-lever mechanism.

3. The combination with a refrigerator providing a top and an ice chamber below the top, having only guiding apertures through said top, of an ice platform within the chamber, a scale lever mechanism located above said top comprising horizontal rods and levers, and occupying a space of small vertical dimension, and suspension members, extending through the guiding apertures in the top, and connecting the scale lever mechanism and the platform.

4. The combination with a refrigerator casing providing an ice chamber, and a horizontal space above said ice chamber, of small vertical dimension, and substantially closed to the ice chamber of an ice platform in the ice chamber, a scale lever mechanism comprising substantially horizontal levers in the space above said chamber, suspension members connecting the ice platform and lever mechanism, and weight indicating means operatively associated with said lever mechanism, exposed at the exterior of the casing.

5. The combination with a refrigerator casing providing an ice chamber having a horizontal top, of an ice platform within the chamber, a scale mechanism above and supported on the top of said chamber, comprising parallel bars running transversely across the top, and pivotally supported, approaching levers connected to said bars, the lever connected to the rear bar extending forward into proximity to the front of the top, a central link whereon said levers bear in opposite direction, means connected to the upwardly bearing, forwardly extending lever only opposing the depression of said lever, indicating means operatively connected with the extended end of said lever, and suspension links connecting the ice platform with the parallel bars.

6. The combination with a refrigerator providing an ice compartment, having a top, a platform within the ice compartment, a frame above the top of said compartment, links suspended from said frame, hangers pivoted at one extremity to said links, connections from the opposite extremity of said hangers to the platform, parallel rods each secured to a pair of hangers between their ends, levers mounted on said rods, connected together midway between the rods, means for resisting depression of said lever, and indicating means associated with the levers for actuation thereby.

7. In a weighing scale, a weight receiving platform, an index cylinder mounted for rotation by depression of said platform, said cylinder having on its cylindrical face a series of indications arranged successively in a spiral line, and a casing providing a narrow longitudinal reading aperture, parallel with the axis of rotation of the cylinder arranged for the display of any one of the spirally arranged indications presented during the rotation of the cylinder.

8. The combination with a refrigerator having a solid top, and a front opening, giving access to an ice chamber, of a movable ice platform within the chamber, suspension links extending from the four corners of said platform through the closed top, a scale lever mechanism providing four points of suspension near the corners of said top to which the suspension links are connected, said lever mechanism lying in a space of relative small vertical dimensions and comprising bars extending in parallelism to the front of the refrigerator and approaching levers centrally connected by a link whereon the forwardly extending lever bears upwardly and the rearwardly extending lever bears downwardly, said forwardly extending lever projecting into proximity to the front of the refrigerator, a weight indicating mechanism disposed on the front of the refrigerator and providing a movable indicating part, an operative connection between said indicating part and the forwardly extended lever, and a spring opposing depression of said lever.

9. The combination with a refrigerator providing an ice chamber having a substantially closed top and a closable front opening, of an ice platform within said chamber, suspension means for said platform extending through the otherwise closed top of the chamber, a frame of small vertical dimensions surrounding the top of said refrigerator, a scale lever mechanism contained within said frame and providing a forwardly extending depressible part terminating in close proximity to the front of the refrigerator, a weight indicating mechanism exposed upon the front of the refrigerator, operative connections between said indicating mechanism and said lever, and a spring opposing depression of said lever.

In testimony whereof I hereunto set my hand in the presence of two witnesses.

FRED D. WEST.

In the presence of—
FORÉE BAIN,
MARY F. ALLEN.